(12) United States Patent
Descubes et al.

(10) Patent No.: US 10,683,804 B2
(45) Date of Patent: Jun. 16, 2020

(54) SYSTEM FOR RECOVERING EXHAUST GAS ENERGY

(71) Applicant: SAFRAN HELICOPTER ENGINES, Bordes (FR)

(72) Inventors: Olivier Pierre Descubes, Moissy-cramayel (FR); Olivier Bedrine, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 476 days.

(21) Appl. No.: 15/542,057

(22) PCT Filed: Feb. 15, 2016

(86) PCT No.: PCT/FR2016/050341
§ 371 (c)(1),
(2) Date: Jul. 6, 2017

(87) PCT Pub. No.: WO2016/132057
PCT Pub. Date: Aug. 25, 2016

(65) Prior Publication Data
US 2018/0274441 A1    Sep. 27, 2018

(30) Foreign Application Priority Data

Feb. 17, 2015   (FR) ...................................... 15 51319

(51) Int. Cl.
*F02C 6/00* (2006.01)
*B64C 27/82* (2006.01)
(Continued)

(52) U.S. Cl.
CPC ................ *F02C 6/18* (2013.01); *B64C 27/82* (2013.01); *F02C 6/006* (2013.01); *F02C 7/141* (2013.01);
(Continued)

(58) Field of Classification Search
CPC ............. F02C 6/006; F02C 3/04; B64C 27/82
See application file for complete search history.

(56) References Cited

U.S. PATENT DOCUMENTS 2,524,066 A * 10/1950 Andersen ............... B64D 33/10
                                                62/241
2,623,357 A * 12/1952 Birmann ................... F02C 7/08
                                                60/39.511
(Continued)

FOREIGN PATENT DOCUMENTS

FR     1166419 A   * 11/1958   ............. F02C 6/006
FR     1166419 A     11/1958
FR     2357734 A1    2/1978

OTHER PUBLICATIONS

Dept. of Thermo and Fluid Dynamics,Chalmers: "MTF 171—Gas turbine technology Exam—Mar. 12, 2005", Mar. 12, 2005 (6 pages).
(Continued)

*Primary Examiner* — Philip J Bonzell
*Assistant Examiner* — Tye William Abell
(74) *Attorney, Agent, or Firm* — Womble Bond Dickinson (US) LLP

(57) ABSTRACT

The invention relates to a system (12) for the recovery of energy from exhaust gases from at least one turboshaft engine, comprising a turbine (34) fitted rotatably around a recovery shaft (40), adapted to bleed off at least a part (14) of the exhaust gases, known as bleed gases (14), and to expand said bleed gases (14) to become expanded gases (42) at a pressure below atmospheric pressure, a first heat exchanger (44), adapted to use a cold source (45) to cool said expanded gases (42) to become cooled gases (46), and a compressor (36) fitted rotatably around said recovery shaft (40), adapted to compress said cooled gases (46) to atmospheric pressure.

6 Claims, 2 Drawing Sheets

(51) Int. Cl.
*F02C 6/18* (2006.01)
*F02C 7/141* (2006.01)
*F02C 7/18* (2006.01)

(52) U.S. Cl.
CPC .......... *F02C 7/18* (2013.01); *F05D 2220/323* (2013.01); *F05D 2220/329* (2013.01); *F05D 2220/62* (2013.01); *F05D 2230/80* (2013.01); *F05D 2260/213* (2013.01); *Y02T 50/671* (2013.01); *Y02T 50/676* (2013.01)

(56) References Cited

U.S. PATENT DOCUMENTS

2011/0262269 A1* 10/2011 Lior .................. F01D 17/10
　　　　　　　　　　　　　　　　　　　　　　　　　415/180
2016/0230671 A1*  8/2016 Thiriet ................ F01D 25/10

OTHER PUBLICATIONS

International Search Report with English language translation, dated Jun. 13, 2016, International Application No. PCT/FR2016/050341 (7 pages).

* cited by examiner

SYSTEM FOR RECOVERING EXHAUST GAS ENERGY

1. TECHNICAL FIELD OF THE INVENTION

The invention relates to a system for the recovery of energy from exhaust gases. In particular, the invention relates to a system for the recovery of energy from exhaust gases from a turboshaft engine fitted to an aircraft, for example a helicopter.

2. TECHNOLOGICAL BACKGROUND

Aircraft, including helicopters, are generally fitted with one or a plurality of turboshaft engines, the principle of which is to drive a turbine in rotation through the combustion of a gas into which fuel is injected.

At the outlet from the turbine, the burnt gas that has driven the turbine in rotation, known as exhaust gas, is discharged to the exterior through an exhaust pipe. The cycles of the turboshaft engine result in exhaust gas temperatures of approximately 600° C. The theoretical thermal energy contained in this flow of exhaust gases is estimated to be 60% of the potential energy contained in the fuel injected at the turbine inlet.

It is therefore advantageous to attempt to recover part of this thermal energy in order to increase the efficiency of the turboshaft engine. To do this, solutions have been proposed, in particular the use of heat exchangers situated in the exhaust pipe of the turboshaft engine, allowing part of the thermal energy to be recovered. This recovered thermal energy is used, for example, to preheat the gas supplied to the turboshaft engine before it is burned, or to reheat a gas from a secondary machine present in the aircraft, of a turbine engine or piston machine type.

However, these solutions lead to a multitude of disadvantages. This is because the presence of a heat exchanger in the exhaust pipe results in pressure losses that affect the operation of the turbine. This heat exchanger can lead to fouling that affects the performance of the turboshaft engine, and requires appropriate washing procedures, and also to degradation in the event of blade loss and blade-shedding. Blade-shedding is a mechanical protection against overspeed of the free turbine of the turboshaft engine.

In addition, the use of such a heat exchanger requires the turboshaft engine to be calibrated for operation with this heat exchanger. In the context of use of the heat exchanger to preheat the gas fuelling the gas turbine, the presence of the heat exchanger requires an engine operating point that is different from the operating point without a heat exchanger, which means that the engine performance is heavily affected if the heat exchanger is not used. This non-use of the heat exchanger, if it is accidental (due to a failure of the heat exchanger), can furthermore cause degradation of the heat exchanger and non-operation of the engine.

Finally, the constraints on the operation of the heat exchanger in an exhaust pipe (high temperatures greater than, or equal to, 600° C., pressure between 4 and 8 bar, etc.), require an appropriate sizing of the heat exchanger resulting, in particular, in an increase in its size and weight, and the use of materials that can withstand these constraints. However, the thermal conduction performance of these materials that are adapted to withstand the constraints is generally poor, which reduces the efficiency and usefulness of the heat exchanger.

3. OBJECTIVES OF THE INVENTION

The aim of the invention is to overcome at least some of the disadvantages of known systems for recovering energy from exhaust gases.

In particular, the invention also aims to provide, in at least one embodiment of the invention, an energy recovery system that does not result in pressure losses that affect the operation of a turboshaft engine.

The invention also aims to provide, in at least one embodiment, an energy recovery system of which a failure does not affect the operation of the turboshaft engine.

The invention also aims to provide, in at least one embodiment of the invention, an energy recovery system that can be put in place on existing turboshaft engines.

The invention also aims to provide, in at least one embodiment, an energy recovery system that allows the use of heat exchangers made of materials with a better heat exchange efficiency.

4. SUMMARY OF THE INVENTION

To that end, the invention relates to a system for the recovery of energy from exhaust gases from at least one turboshaft engine, comprising:
  a turbine fitted rotatably around a recovery shaft, adapted to bleed off at least a part of the exhaust gases, known as bleed gases, and to expand said bleed gases to become expanded gases at a pressure below atmospheric pressure;
  a first heat exchanger, adapted to use a cold source to cool said expanded gases to become cooled gases;
  a compressor fitted rotatably around said recovery shaft, adapted to compress said cooled gases to atmospheric pressure;
  a fan configured to bring the cold source to the first heat exchanger, the fan being driven in rotation by the recovery shaft.

A system according to the invention therefore allows the recovery of at least a part of the energy from the exhaust gases from at least one turboshaft engine, this being performed in an offset manner, unlike the prior art. This is because here, a part of the exhaust gases is bled off in order to perform the heat exchange via the heat exchanger in conditions more favourable than in the prior art, where the heat exchanger is situated in an exhaust pipe of the turboshaft engine. The turbine, allowing the exhaust gases to be bled off, also allows the pressure of the exhaust gases to be reduced, and therefore the temperature of the exhaust gases to fall. The heat exchanger is therefore subject to a lower pressure and a lower temperature, allowing the use of materials with a better heat exchange efficiency. Likewise, the fact that the pressure of the gases circulating between the turbine and the compressor is low, below atmospheric pressure, generally limits the internal stresses by these gases on the components of the energy recovery system.

Preferably, the energy recovery system does not bleed off all the exhaust gases, in order to maintain a good level of efficiency by taking off mainly the high-temperature gases, the portion of the exhaust gases bled off being dependent on the aerodynamics of an exhaust pipe of the turboshaft engine allowing the exhaust gases to be discharged. The bleeding-off can advantageously be performed in an elbowed portion of the exhaust pipe. An elbowed portion of this kind is, for example, generally present in the exhaust pipes of the turboshaft engines fitted to helicopters.

The energy recovered from the exhaust gases originates from the difference between the mechanical energy produced when the exhaust gases pass through the turbine and transmitted to the recovery shaft, and the energy consumed by the recovery shaft to drive the compressor in rotation in order to compress the exhaust gases cooled by the first heat exchanger. Any energy needed to bring the cold source to the exchanger may be taken from this recovered energy if necessary. The recovered energy can therefore be used in the form of mechanical energy transmitted by the recovery shaft. The recovery shaft is then, for example, connected to other shafts, through a relay box, to provide these other shafts with additional mechanical energy. The shafts capable of using the recovered energy at the recovery shaft are, for example, a shaft of the free turbine of the turboshaft engine, a shaft of the gas generator of the turboshaft engine, a shaft of the main transmission box of a helicopter, a rear shaft connected to the tail rotor of a helicopter, etc. This recovered energy at the recovery shaft is in the form of mechanical energy, but can subsequently be converted into another form (electrical, pneumatic, etc.).

Furthermore, bleeding off part of the exhaust gases does not cause pressure losses in the turboshaft engine. Unlike the prior art, in which the exchanger was situated in the exhaust pipe of the turboshaft engine, the bleeding of exhaust gases through the turbine does not disrupt the normal operation of the turboshaft engine and therefore limits pressure losses. In addition, any failure of the energy recovery system will not affect the operation of the turboshaft engine, all the exhaust gases of which will be discharged via the exhaust pipe. Furthermore, the energy recovery system can in this way be adapted to turboshaft engines that already exist, and does not require any change in the operating point of the turboshaft engine on which it is installed and therefore does not affect its performance.

Advantageously, a system according to the invention comprises a second heat exchanger, adapted to perform a preliminary cooling of the expanded gases, before they pass into the first heat exchanger.

According to this aspect of the invention, the second exchanger allows the temperature of the exhaust gases to be reduced before they pass into the first heat exchanger, to allow an additional reduction in the temperature constraints of the first heat exchanger, which can thus be designed so as to allow a high heat exchange performance via more efficient materials and a reduced sizing. Advantageously and according to the invention, the material used by the first exchanger is aluminium, allowing a good compromise between good heat exchange performance (thermal conductivity of approximately 150 W/m/° C.) for a reduced weight (density of approximately 2700 kg/m$^3$).

Advantageously, a system according to the invention comprises an external air intake, adapted to perform a preliminary cooling of the expanded gases, before they pass into the first heat exchanger.

According to this aspect of the invention, the air intake allows the expanded gases to mix with air from the exterior in order to reduce their temperature. The injection of external air through the air intake is facilitated by the fact that the expanded gases are at a lower pressure than the atmospheric pressure of the external air. The gases cooled in this way are sent to the first exchanger. The air intake can replace or supplement the second exchanger described previously.

Advantageously, a system according to the invention comprises a plurality of ducts connecting the turbine to a plurality of exhaust pipes for bleeding off exhaust gases originating from a plurality of turboshaft engines.

According to this aspect of the invention, a single energy recovery system allows the recovery of part of the energy of the exhaust gases originating from a plurality of turboshaft engines.

The invention also relates to a turboshaft engine, fitted with an energy recovery system according to the invention.

A turboshaft engine according to the invention allows a better overall efficiency of operation through the recovery of a part of the potential energy in the form of heat contained in the exhaust gases, through the energy recovery system.

Advantageously, a turboshaft engine according to the invention further comprises a gas generator driven in rotation by a gas generator shaft, and the recovery shaft is connected to the gas generator shaft.

According to this aspect of the invention, the mechanical energy recovered by the energy recovery system is used at the gas generator shaft, thus increasing the performance of the turboshaft engine. In the event of failure of the energy recovery system, the gas generator can operate normally, the only consequence being a reduction in the performance of the turboshaft engine.

Advantageously, a turboshaft engine according to the invention further comprises a free turbine driving in rotation a free turbine shaft, and the recovery shaft is connected to the free turbine shaft.

According to this aspect of the invention, the mechanical energy recovered by the energy recovery system is used at the free turbine shaft, intended, for example, to drive the rotation of a propeller, thus increasing the performance of the turboshaft engine. In the event of a failure of the energy recovery system, the gas generator can operate normally, the only consequence being a reduction in the performance of the turboshaft engine.

The invention also relates to a helicopter comprising a turboshaft engine according to the invention.

Advantageously and according to the invention, the helicopter further comprising a tail rotor driven by a rear shaft, and the recovery shaft is connected to said rear shaft.

The invention also relates to a method for the recovery of energy from turboshaft engine exhaust gases, comprising:
  a step of bleeding off at least a part of the exhaust gas;
  a step of expanding the exhaust gas bled off at the bleeding-off step;
  a step of cooling the exhaust gas expanded at the expansion step;
  a step of compressing the exhaust gas cooled at the cooling step.

Advantageously, the energy recovery method according to the invention is implemented by the energy recovery system according to the invention.

Advantageously, the energy recovery system according to the invention implements the energy recovery method according to the invention.

The invention also relates to an energy recovery system, an energy recovery method, a turboshaft engine and a helicopter characterised in combination by all or part of the features mentioned above or below.

5. LIST OF FIGURES

Other aims, features and advantages of the invention will become apparent on reading the description that follows, given in a purely non-restrictive manner and which refers to the accompanying figures, wherein.

6. DETAILED DESCRIPTION OF AN EMBODIMENT OF THE INVENTION

The following embodiments are examples. Although the description refers to one or a plurality of embodiments, this does not necessarily mean that each reference relates to the same embodiment, or that the features apply only to a single embodiment. Single features of different embodiments can also be combined in order to provide other embodiments.

Figure 1:
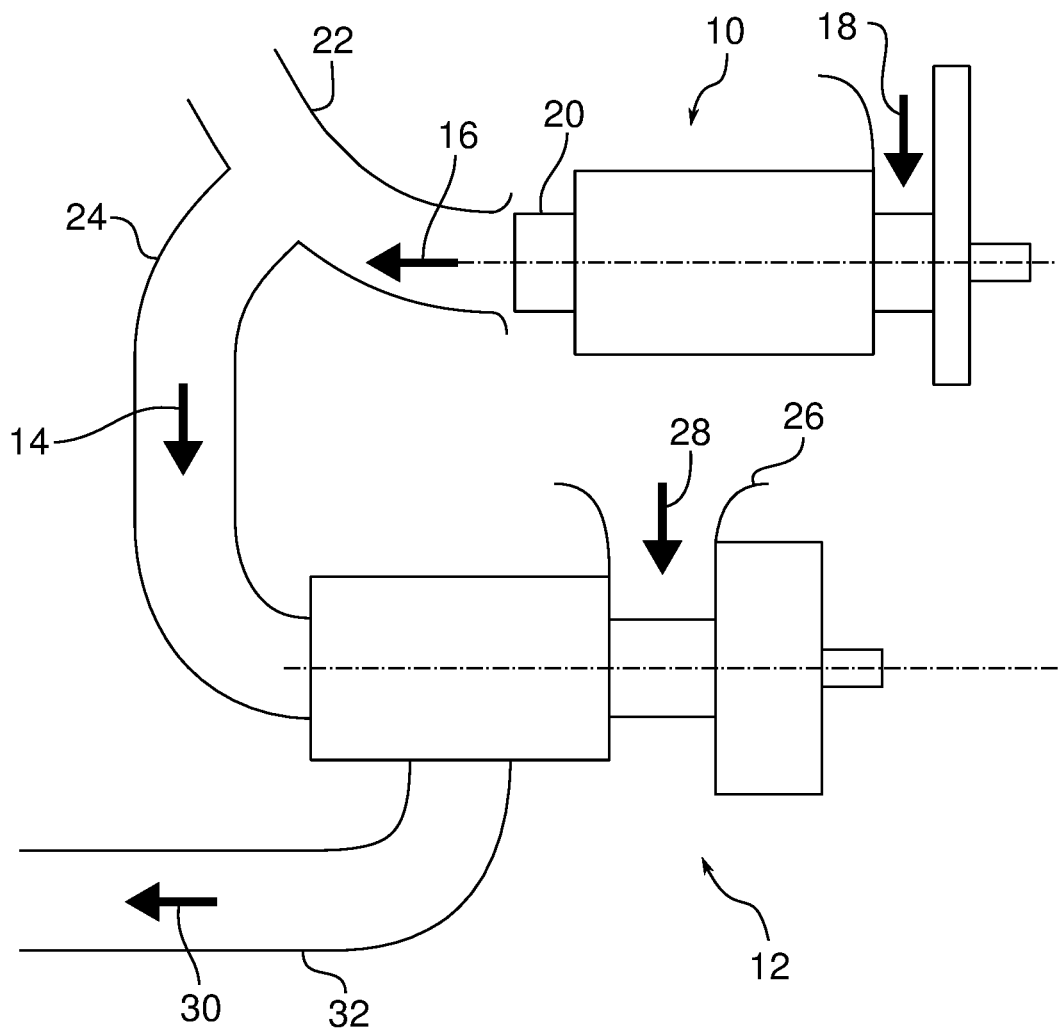
FIG. 1 is a diagrammatic view of a turboshaft engine fitted with an energy recovery system according to an embodiment of the invention.

FIG. 1 is a diagrammatic representation of a turboshaft engine 10 fitted with an energy recovery system 12 according to an embodiment of the invention.

The energy recovery system 12 is adapted to recover at least a part 14 of the exhaust gases of the turboshaft engine 10 in order to recover a part of the thermal energy originating from the exhaust gases 16. These exhaust gases 16 are formed by gases 18 that enter the turboshaft engine 10 via an inlet duct, are then mixed with fuel and burned in the turboshaft engine 10 in order to drive the rotation of a free turbine 20 at the outlet from the turboshaft engine 10. Most of the kinetic energy of the burned gases is recovered by the free turbine 20 being set in rotation, the residual kinetic energy allowing the exhaust gases 16 to be discharged at the outlet from this free turbine 20. The exhaust gases 16 are discharged via an exhaust pipe 22, allowing, in the context of the use of the turboshaft engine 10 in an aircraft, the exhaust gases 16 to be discharged to the open air, outside the aircraft.

The energy recovery system 12 allows a part of these exhaust gases, represented by the arrow 14, to be bled off, for example by means of a bleed duct 24 connected to the exhaust pipe 22 of the turboshaft engine 10. The bleeding-off of the part 14 of the exhaust gases is performed by virtue of a turbine that allows the bled-off exhaust gases to expand, allowing the part 14 of the exhaust gases in the exhaust pipe to be aspirated via the bleed duct 24. According to another embodiment of the invention, the energy recovery system 12 comprises a plurality of bleed ducts connected to a plurality of exhaust pipes, in order to bleed off a part of the exhaust gases originating from a plurality of turboshaft engines.

The energy recovery system 12 also comprises a duct 26 for the admission of external air 28, allowing the gas bled off through the turbine to be cooled by means of a heat exchanger present in the energy recovery system 12. Once the energy from the part 14 of the exhaust gases has been recovered, the outlet gases 30 are discharged through a discharge duct 32. This discharge duct 32 can also be used to discharge the external air 28 after it has passed into the heat exchanger.

Figure 2:
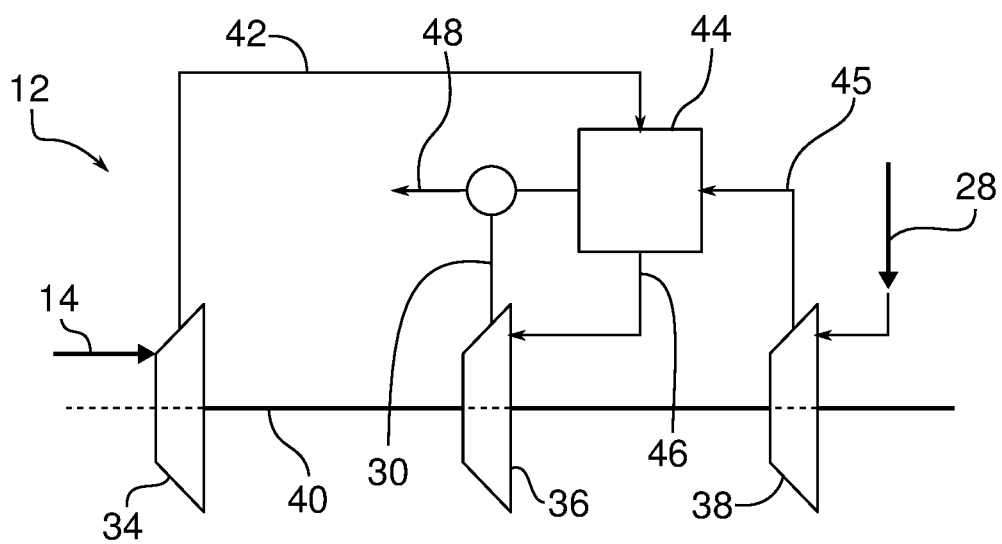
FIG. 2 is a diagrammatic view of an energy recovery system according to a first embodiment of the invention.

FIG. 2 is a diagrammatic representation of the energy recovery system 12 according to a first embodiment. In this first embodiment, the turbine 34, a compressor 36 and a fan 38 are connected to a recovery shaft 40. The turbine 34 bleeds off a part 14 of the exhaust gases from the exhaust pipe 10, and allows these exhaust gases to expand and therefore their temperature to reduce, thus forming expanded gases, represented by the arrow 42. The pressure of the expanded gases 42 resulting from the expansion through the turbine 34 is less than the atmospheric pressure. The expanded gases 42 pass through a first heat exchanger 44 to allow them to cool, thus forming cooled gases, represented by the arrow 46. The cooling of the expanded gases 42 is performed at the first heat exchanger 44 by virtue of a cold source 45, here brought to the first heat exchanger 44 by the fan 38 driven in rotation by the recovery shaft 40 and allowing the addition of external air 28.

The gases 46 cooled by the first heat exchanger 44 are sent to the compressor 36, connected to the recovery shaft 40. The compressor compresses the cooled gases 46 in order to obtain gases at a pressure substantially equal to atmospheric pressure, known as outlet gases 30, which are, for example, discharged through a discharge duct 32 as shown previously with reference to FIG. 1. The discharge duct also allows the discharge of the cold source 45 after it has passed into the first heat exchanger 44. The discharge of the cold source 45 and the outlet gases 30 is represented by the arrow 48.

The energy recovered by the energy recovery system 12 can be used in the form of mechanical energy transmitted by the recovery shaft 40. This recovered mechanical energy originates from the difference between the mechanical energy brought to the recovery shaft 40 by the rotation of the turbine 34 because of the passage of the part 14 of the exhaust gases, and the mechanical energy originating from the recovery shaft 40 and consumed by the compressor 36 in order to compress the cooled gases 46 to a pressure substantially equal to atmospheric pressure. The cooling of the expanded gases by the first heat exchanger 44 makes it possible to reduce the temperature of the expanded gases and thus to reduce the energy needed by the compressor 36 to compress the cooled gases to atmospheric pressure. The amount of energy recovered is therefore dependent on the efficiency of the cooling by the first heat exchanger 44. The energy consumed by the fan 38 also has to be taken from the recovered energy. The recovered energy at the recovery shaft 40 can then, for example, be transmitted to other shafts of an aircraft, by means of a relay box, or converted into another form of energy.

In certain situations, the temperature of the expanded gases 42 remains high at the outlet from the turbine and on their entry into the first heat exchanger 44. Consequently, the dimensions and the material of first heat exchanger 44 must be compatible with these high temperatures, although they are lower than the temperatures encountered in the exhaust pipe 22 of the turboshaft engine 10.

Figure 3:
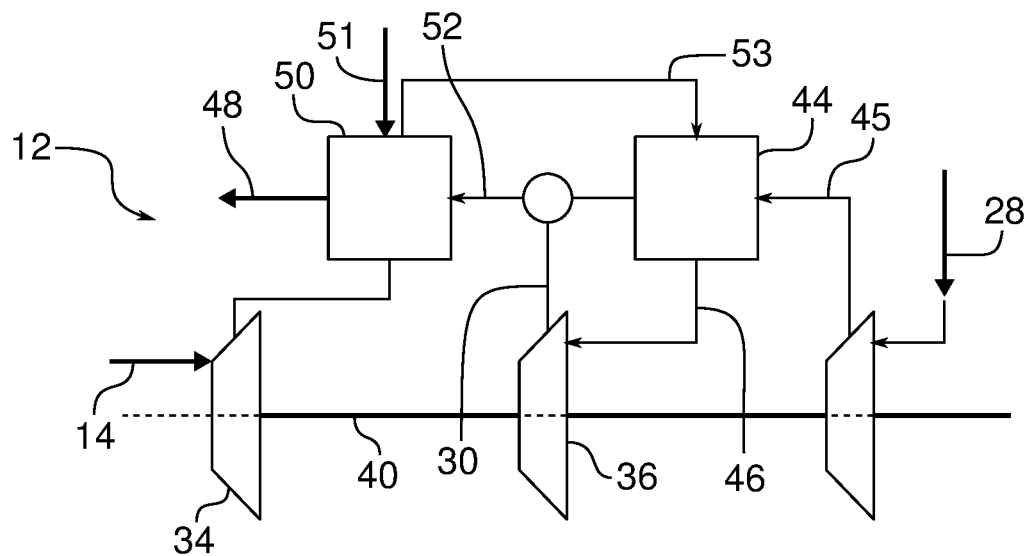
FIG. 3 is a diagrammatic view of an energy recovery system according to a second embodiment of the invention.

In order to allow the use of a more efficient first heat exchanger 44, one solution is to reduce the temperature of the expanded gases 42 beforehand. To do this, the energy recovery system 12 comprises a second heat exchanger 50 allowing the expanded gases 42 to be cooled before passing into the first heat exchanger 40, as shown with reference to FIG. 3. In FIG. 3, the elements that are unchanged relative to the embodiment shown in FIG. 2 bear the same reference numbers. The preliminary cooling in the second heat exchanger 50 is performed using a second cold source 52, consisting, for example, of outlet gases 30 leaving the compressor and of the cold source 45 after it has passed into the first heat exchanger 44. Thus, by virtue of this preliminary cooling by the second heat exchanger 50, the temperature of the gases 53 entering the first heat exchanger is lower. The first heat exchanger 44 can therefore be made of a material with more appropriate temperature limits and allowing a more efficient cooling and/or smaller dimensions and lower weight.

For example, a material resistant to high temperatures, such as steel, has a thermal conductivity of approximately 15 W/m/° C. and a density of approximately 7800 kg/m$^3$. The second heat exchanger 50 can therefore be made of steel, for example. Aluminium has a lower resistance to high temperatures, but a higher thermal conductivity, approximately 150 W/m/° C., and a density of approximately 2700 kg/m$^3$. The first heat exchanger 44 can therefore be made of aluminium, for example, allowing a more efficient cooling of the gases 53 passing through it, for a reduced weight.

Other types of metals or metal alloys can be used for the manufacture of the first heat exchanger 44 and the second heat exchanger 50, depending on the constraints on temperatures and sizing, and the desired performance, which may vary according to the turboshaft engines from which at least a part of the exhaust gases are bled off, and according to the embodiments, with one or two exchangers. Preferably, the heat exchangers and/or the materials used in these heat exchangers have already been tested for an application in an aircraft. For example, the energy recovery system can use heat exchangers of the type that are used in aircraft cabin air conditioning systems, which have already been tested for aviation use.

A preliminary cooling before entry into the first heat exchanger 44 is also performed, in this embodiment, through the use of an air intake 51, allowing external air to be injected into the gases going to the first heat exchanger 44. The mixing of the gases with external air thus allows a reduction in temperature. The injection of external air is furthermore facilitated by the fact that the gases present in the energy recovery system 12 are at a pressure that is lower than atmospheric pressure.

Depending on the embodiments, the energy recovery system 12 may comprise the first heat exchanger 44 only, or the first heat exchanger 44 accompanied by the second heat exchanger 50, or accompanied by the air intake 51, or accompanied by a combination of the second heat exchanger 50 and the air intake 51.

Figure 4:
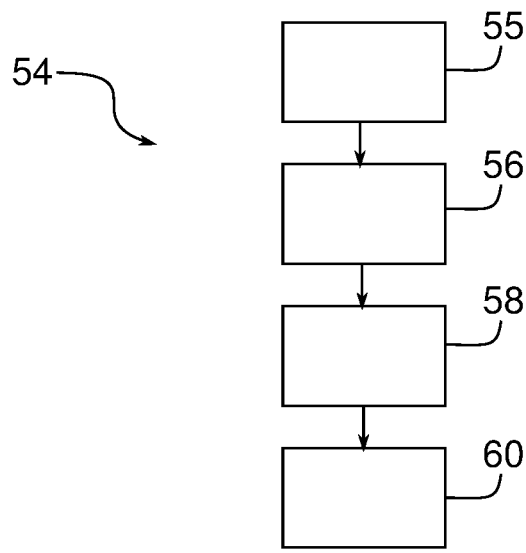
FIG. 4 is a diagrammatic representation of an energy recovery method according to an embodiment of the invention.

FIG. 4 is a diagrammatic representation of a method 54 for energy recovery according to an embodiment of the invention. The energy recovery method 54 comprises a step 55 of bleeding off at least a part of the exhaust gases, known as bleed gases, originating from a turboshaft engine, as described with reference to FIG. 1. The bleed gases are then expanded in a step 56 of expanding the bleed gases, for example through the turbine 34 in the energy recovery system 12 as described previously. This expansion step 56 allows the formation of expanded gases, the temperature of which is lower than that of the bleed gases because of the reduction in pressure. The expanded gases are then cooled during a cooling step 58, to form cooled gases. These cooled gases are then compressed during a compression step 60.

The energy recovery method 54 implemented in this way follows a thermodynamic cycle that is a reverse Brayton cycle with pressure reduction. The mechanical energy recovered by this cycle originates from the thermal energy contained in the exhaust gases that are bled off.

Figure 5:
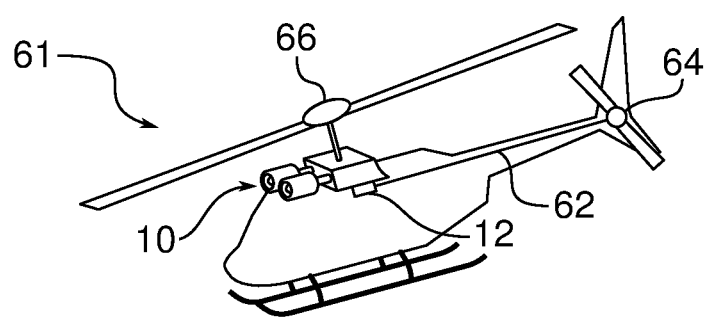
FIG. 5 is a diagrammatic view of a helicopter comprising a turboshaft engine according to an embodiment of the invention.

FIG. 5 is a diagrammatic representation of a helicopter 61 comprising a turboshaft engine 10 according to an embodiment of the invention. The turboshaft engine is fitted with an energy recovery system 12 according to an embodiment of the invention. In this embodiment, the energy recovery system 12 is connected to a rear shaft 62 of the helicopter 61. This rear shaft 62 allows a tail rotor 64 of the helicopter 61 to be set in rotation, allowing the helicopter to be stabilised, in particular by compensating for the torque exerted by the main rotor 66 driven by the turboshaft engine 10 via a main transmission box. The mechanical energy recovered by the energy recovery system 12 is thus transmitted by the recovery shaft 40 to the rear shaft 62 of the helicopter 61.

The starting of the energy recovery system 12 requires the recovery shaft 40 connected to the turbine 34 and the compressor 36 to be set in rotation beforehand by the addition of an external energy source, for example through the rear shaft 62 of a helicopter. The energy recovery system 12 is therefore an energy receiver during start-up. Once the operating point has been reached, the energy recovery system 12 reaches an equilibrium in which it becomes motive by virtue of the bleeding-off of at least a part of the exhaust gases allowing the recovery of mechanical energy.

The invention is not restricted only to the embodiments described. In particular, the cold source used at the exchanger or exchangers can take different forms, for example a supply of air via an electric fan or via a pump, etc. In addition, the mechanical energy generated by the system can be reused in a different form, for example at the main transmission box of the helicopter, or by conversion into pneumatic energy, electrical energy, etc. Furthermore, the energy recovery system can comprise more than two exchangers.

The invention claimed is:

1. A turboshaft engine, fitted with a system for the recovery of energy from exhaust gases from the turboshaft engine, comprising:
    a turbine fitted rotatably around a recovery shaft, adapted to bleed off at least a part of the exhaust gases, known as bleed gases, and to expand said bleed gases to become expanded gases at a pressure below atmospheric pressure;
    a first heat exchanger, adapted to use a cold source to cool said expanded gases to become cooled gases;
    a compressor fitted rotatably around said recovery shaft, adapted to compress said cooled gases to atmospheric pressure;
    a fan configured to bring the cold source to the first heat exchanger, the fan being driven in rotation by the recovery shaft;
    a turbine driving in rotation a turbine shaft, the recovery shaft being connected to the turbine shaft.

2. The turboshaft engine according to claim 1, wherein the energy recovery system comprises a second heat exchanger, adapted to perform a preliminary cooling of the expanded gases, before they pass into the first heat exchanger.

3. The turboshaft engine according to claim 1, wherein the energy recovery system comprises an air intake, adapted to perform a preliminary cooling of the expanded gases, before they pass into the first heat exchanger.

4. The turboshaft engine according to claim 1, wherein the energy recovery system comprises a plurality of ducts connecting the turbine to a plurality of exhaust pipes for bleeding off exhaust gases originating from a plurality of turboshaft engines.

5. A helicopter comprising a turboshaft engine according to claim 1.

6. The helicopter according to claim 5, further comprising a tail rotor driven by a rear shaft, wherein the recovery shaft is connected to said rear shaft.

* * * * *